United States Patent [19]

Ackermann

[11] Patent Number: 5,604,390

[45] Date of Patent: Feb. 18, 1997

[54] PERMANENT MAGNET MOTOR WITH RADICALLY MAGNETIZED ISOTROPIC PERMANENT MAGNET CYLINDRICAL YOKE

[75] Inventor: Bernd Ackermann, Aachen, Germany

[73] Assignee: U.S. Philips Corporation, New York, N.Y.

[21] Appl. No.: 498,290

[22] Filed: Jun. 30, 1995

[30] Foreign Application Priority Data

Jul. 6, 1994 [DE] Germany ............................ 44 23 620.4

[51] Int. Cl.⁶ .................................................. H02K 21/12
[52] U.S. Cl. ........................ 310/156; 310/162; 310/157; 310/261
[58] Field of Search ................................ 310/156, 261, 310/157

[56] References Cited

U.S. PATENT DOCUMENTS

| | | | |
|---|---|---|---|
| 4,417,186 | 11/1983 | Hirose et al. | 318/254 |
| 4,513,216 | 4/1985 | Muller | 310/156 |
| 4,888,506 | 12/1989 | Umehara et al. | 310/13 |
| 5,038,065 | 8/1991 | Matsubayashi et al. | 310/162 |
| 5,066,880 | 11/1991 | Banon | 310/156 |
| 5,162,685 | 11/1992 | Yamaguchi et al. | 310/156 |
| 5,359,248 | 10/1994 | Nagate et al. | 310/156 |
| 5,378,953 | 1/1995 | Uchida et al. | 310/156 |
| 5,493,157 | 2/1996 | Nakamura | 310/67 R |

FOREIGN PATENT DOCUMENTS

| | | |
|---|---|---|
| 0598137 | 5/1994 | European Pat. Off. . |
| 705 | 1/1979 | Japan . |
| 61-203853 | 9/1986 | Japan . |

*Primary Examiner*—Steven L. Stephan
*Assistant Examiner*—Nicholas Ponomarenko
*Attorney, Agent, or Firm*—Edward Blocker; Bernard Franzblau

[57] ABSTRACT

An electric motor with permanent-magnet excitation, particularly an internal-rotor or external-rotor motor, having motor parts which are movable relative to one another. One motor part forms a multi-pole excitation field in an air gap by means of permanent magnets and the other motor part comprises a coil configuration situated in the air gap. The coil configuration is free of soft-magnetic material. The permanent-magnetically excited motor part includes a cylindrical yoke having substantially radial slots which are uniformly spaced about the circumference and in which the permanent magnets are mounted. The permanent magnets are magnetized in a circumferential direction with directions of magnetization which change from magnet to magnet. The cylindrical yoke is made of an isotropic permanent-magnet material which, in the yoke portions between the permanent magnets mounted in the slots, is predominantly radially magnetized in a manner such that the resulting magnetic field in the air gap has the same polarity as the magnetic field produced by the permanent magnets in the slots. The permanent magnets are made of an anisotropic permanent-magnet material.

16 Claims, 2 Drawing Sheets

1

PERMANENT MAGNET MOTOR WITH RADICALLY MAGNETIZED ISOTROPIC PERMANENT MAGNET CYLINDRICAL YOKE

BACKGROUND OF THE INVENTION

This invention relates to an electric motor with permanent-magnet excitation, having motor pans which are movable relative to one another, of which one motor pan forms a multi-pole excitation field in an air gap by means of permanent magnets and the other motor part comprises a coil configuration situated in this air gap, the permanent-magnetically excited motor pan comprising a cylindrical yoke having substantially radial slots, which are uniformly spaced about the circumference and in which permanent magnets are mounted, which permanent magnets are magnetised in a circumferential direction with directions of magnetisation which change from magnet to magnet.

The generation of multi-pole magnet fields is one of the most important technical uses of permanent magnets, most of these components being used in permanent-magnet motors. These components may have different shapes. The most important shapes include rotationally symmetrical disks, which produce a multi-pole magnetic field in an axial direction, rectangular blocks, which generate a multi-pole field directed perpendicularly to one of the block surfaces, and cylinders or hollow cylinders, which generate a multi-pole magnetic field in a radial direction.

DE 36 07 648 C2, which corresponds to U.S. Pat. No. 4,679,313 Jul. 14, 1987 discloses a motor in which permanent-magnet annular segments are arranged on an iron sleeve, thus forming a cylindrical permanent-magnet rotor. The permanent magnets are magnetised in such a manner that in the direction of the air gap each north pole is followed by a south pole. The rotor is surrounded by a cylindrical stator without winding slots. The winding is arranged in the air gap between the permanent-magnet rotor and a soft-magnetic stator sleeve.

If only those materials which are currently used in large quantities are considered, these segments can be made either of ferrites, which are cheap but which generate comparatively weak magnetic fields, or rare-earth materials, which are expensive but which produce strong magnetic fields.

For both groups of materials a distinction is made between sintered and resin-bonded materials. The sintered materials are anisotropic, as a result of which the magnetic fields produced by them are stronger than those produced by the isotropic resin-bonded materials. The disadvantage of sintered materials is that they can be manufactured only in simple shapes and these shapes are anisotropic only in a few directions which are dictated by physical properties. Therefore, only simple magnetisation patterns can be produced. Moreover, it is very difficult to manufacture sintered magnets with narrow tolerances of their mechanical dimensions. Conversely, resin-bonded materials have the advantage that components with complicated geometries and narrow mechanical tolerances can be manufactured at low cost and that by means of a suitable magnetisation process it is also possible to obtain intricate magnetisation patterns in the material.

A problem when generating multi-pole radial magnetic fields is that to date cylinders or hollow cylinders with radial anisotropy cannot be manufactured in an industrial process. It is possible to manufacture cylinders or hollow cylinders with diametral anisotropy, but these are only capable of generating two-pole magnetic fields and are therefore not suitable for uses requiring magnetic fields with a larger number of poles.

The manufacture of the rotors described in DE 36 07 648 C2 is intricate because the permanent-magnetic annular segments each have to be glued onto the rotor sleeve. To guarantee a reliable operation rotor binding is necessary. Large magnetic fields can be obtained when the magnet segments are made of an anisotropic material. However, even the production of annular segments from an anisotropic material is already very intricate.

From DE 42 16 938 (PHD 92.057) a permanent-magnet rotor is known which consists of an iron yoke having radial slots in which block-shaped permanent magnets are mounted. These permanent magnets are magnetised circumferentially and have a direction of magnetisation which changes from magnet to magnet in the circumferential direction. These rotors can be manufactured more simply than the rotors known from DE 36 07 648 C2. Gluing the blocks into the slots is not a problem. No additional fastening is required. Their simple geometry allows the block-shaped magnets to be simply made of an anisotropic material and to be subsequently magnetised so that large magnetic fields can be produced.

SUMMARY OF THE INVENTION

It is an object of the invention to provide a rotor for an electric motor of the type defined in the opening paragraph, which in comparison with the known constructions generates a substantially larger magnetic field in the air gap, so as to produce a larger torque for a given current in the coil configuration.

According to the invention this object is achieved in that the cylindrical yoke consists of an isotropic permanent-magnet material which in yoke portions between the permanent magnets in the slots is predominantly radially magnetised with such a polarity that the polarity of the resulting magnetic field in the air gap corresponds to the polarity of the magnetic field produced by the permanent magnets in the slots, and in that the permanent magnets in the slots consist of an anisotropic permanent-magnet material.

In this way it is achieved that the yoke actively contributes to the generation of the multi-pole magnetic field.

In a further embodiment of the invention the slots have an inclination between —30° and +30° relative to the radial direction. By varying this inclination it is possible to adapt the shape of the magnetic field in the air gap and, consequently, the voltage induced in the coil configuration to specific requirements.

In a further embodiment of the invention the coil configuration consists of curved foil windings. This provides a higher copper factor in the case of a flat construction.

In a further embodiment of the invention the coil configuration consists of curved preformed wound coils. Such a coil configuration can be manufactured economically.

In a further embodiment of the invention a cylindrical yoke of a soft-magnetic material is disposed at the side of the air gap which faces the permanent magnet, behind the coil configuration, which yoke is fixedly connected to the coil configuration.

In a further embodiment of the invention a cylindrical yoke of a soft-magnetic material is disposed at the side of the air gap which faces the permanent magnet, behind the coil configuration, which yoke is fixedly connected to the permanent magnet. This has the advantage that the rotor no longer induces any alternating fields in the cylindrical yoke, so that iron losses no longer occur.

BRIEF DESCRIPTION OF THE DRAWING

The invention will now be described in more detail with reference to the drawings. In the drawings.

DESCRIPTION OF THE PREFERRED EMBODIMENTS

Figure 1:
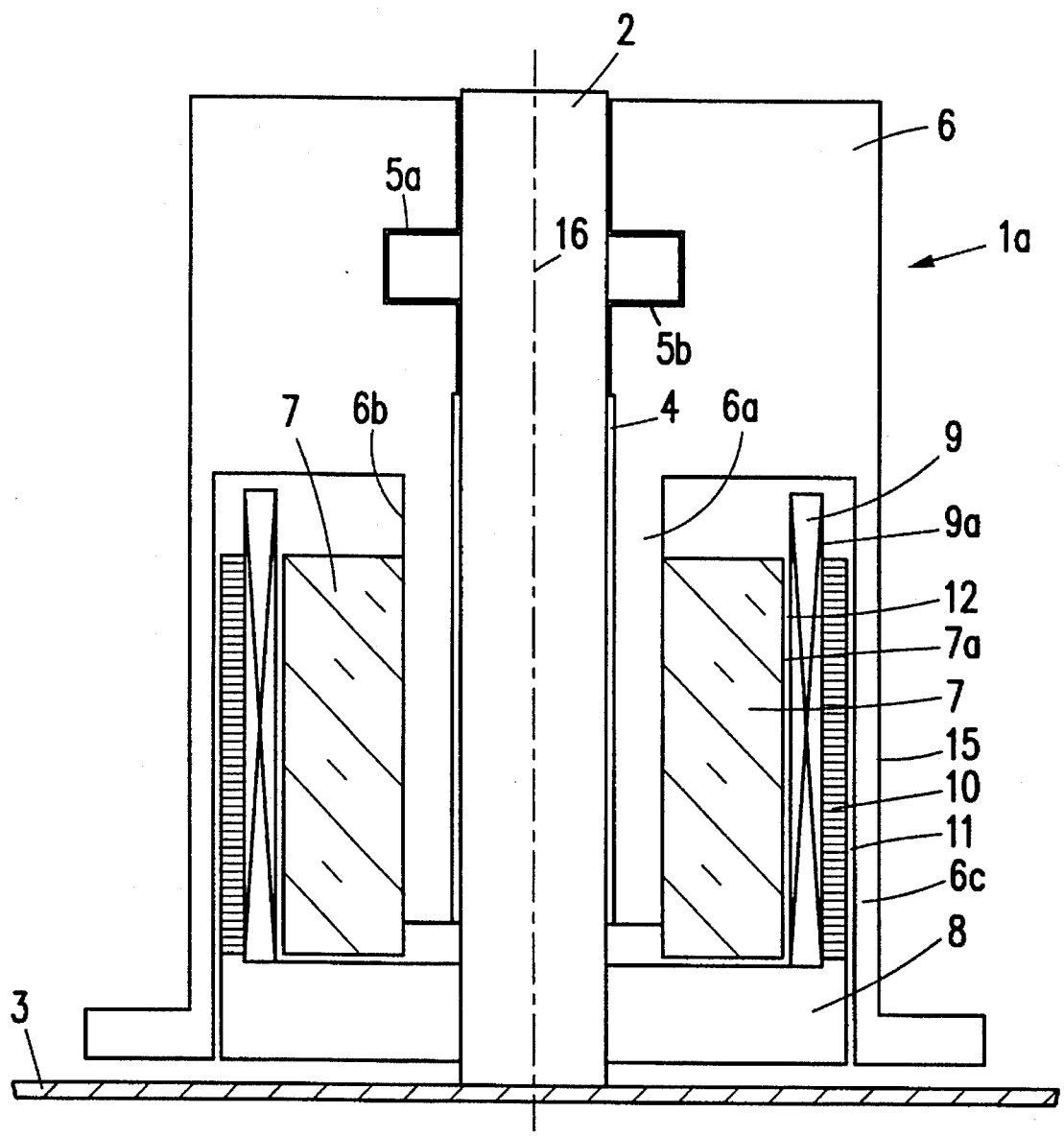
FIG. 1 shows an example relating to a spindle motor having a cylindrical rotor.

FIG. 1 is a sectional view of a spindle motor 1a, intended particularly as a drive motor for hard disk drives in data processing equipment. A motor shaft 2 of this spindle motor 1a is fixedly connected to a disk 3 of a hard disk housing, not shown. Bearings 4, 5a and 5b support a rotatable hub 6 on the motor shaft 2. The hub 6 has an inner hub portion 6a surrounding the motor shaft 2 and carrying a permanent-magnet cylindrical rotor 7 on its outer circumference 6b. The field generated by the rotor magnet 7 at its outer circumference 7a extends perpendicularly to the axis of rotation 16. The motor shaft 2 carries a mounting plate 8. This mounting plate carries externally a coil configuration 9, which belongs to the motor, and a yoke 10. The hub 6 further has an outer hub portion 6c, which surrounds the yoke 10.

The coil configuration 9 may consist of a curved foil winding or of curved preformed wound coils. With the present motor construction the mounting plate 8 carries the sleeve-shaped soft-magnetic yoke 10 at the outer circumference 9a of the coil configuration 9. With this construction two air gaps 11 and 12 are formed, one air gap 11 separating the yoke 10 from the hub 6 and the other air gap 12 separating the rotor magnet 7 from the coil configuration 9.

Figure 2:
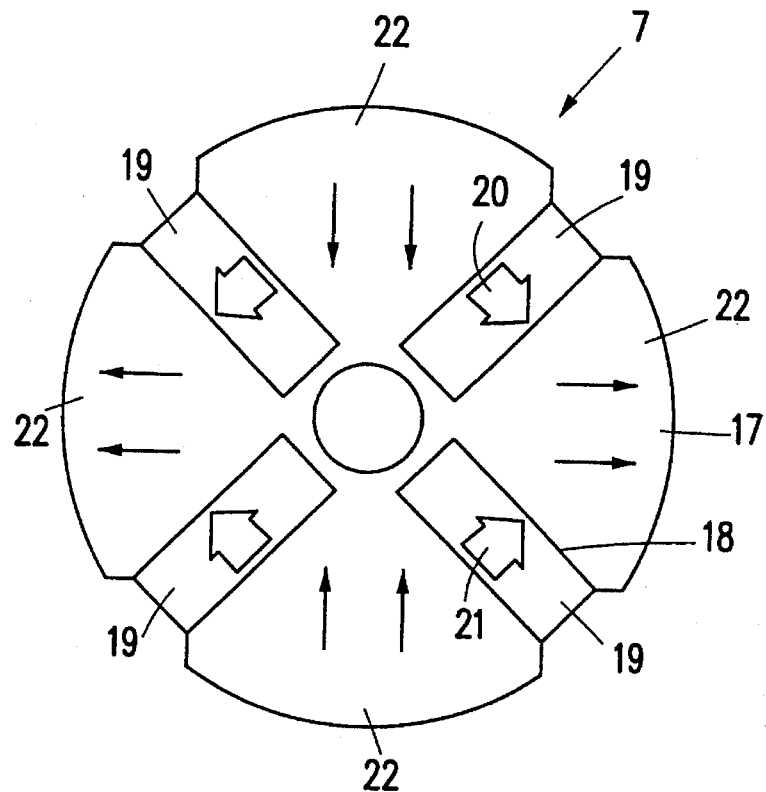
FIG. 2 is a sectional view of the rotor with permanent magnets mounted in radial slots.

FIG. 2 is a sectional view of the permanent-magnet rotor 7. This rotor consists of a cylindrical yoke 17 of an isotropic magnet material, which has radial slots 18 in which the block-shaped permanent magnets 19 of an anisotropic material are mounted. These permanent magnets 19 are circumferentially magnetised and have directions of magnetisation 20, 21 which change from magnet to magnet in the circumferential direction. In its portions 22 between the permanent magnets 19 mounted in the slots 18 the yoke 17 is predominantly radially magnetised in such a manner that the resulting magnetic field in the air gap 11 has the same polarity as the magnetic field produced by the permanent magnets 19 mounted in the slots 18.

Figure 3:
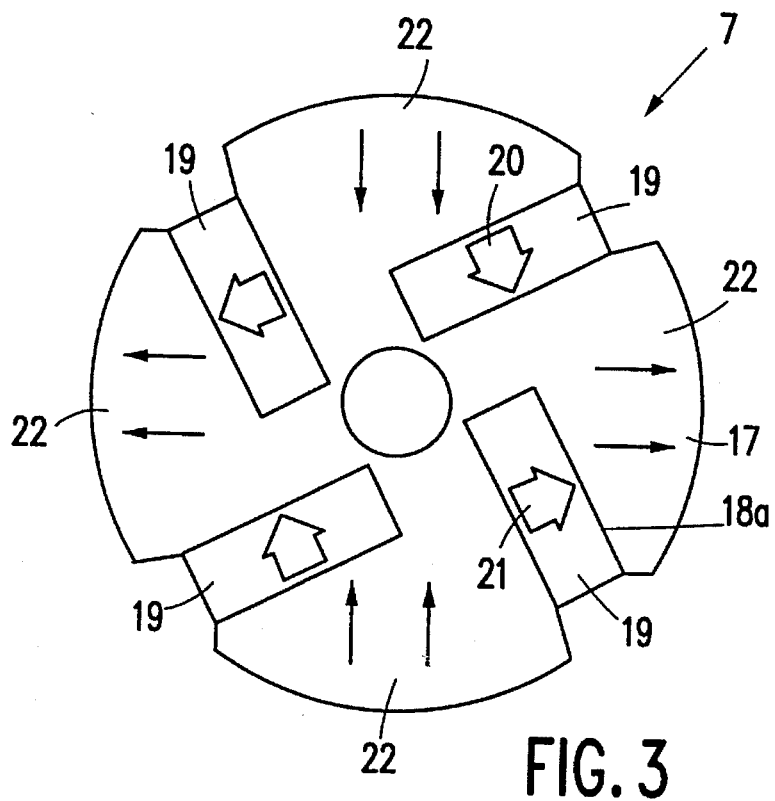
FIG. 3 is a sectional view of the rotor with permanent magnets mounted in slots which are inclined relative to the radial direction.

FIG. 3 is a modification of the embodiment shown in FIG. 2, in which the slots 18a have an inclination of approximately 20° relative to the radial direction.

In another embodiment of the invention which is not shown herein, it is also possible that the cylindrical yoke 10 of a soft-magnetic material is disposed at the side of the air gap which faces the permanent magnet 7, behind the coil configuration 9, which yoke is fixedly connected to the permanent magnet 7. This has the advantage that the rotor 7 no longer induces any alternating fields in the cylindrical yoke, so that iron losses do not occur.

I claim:

1. An electric motor with permanent-magnet excitation, comprising: motor parts which are movable relative to one another, wherein one motor part forms a multi-pole excitation field in an air gap by means of permanent magnets and the other motor part comprises a coil configuration situated in the air gap, the permanent-magnetically excited motor part comprising a cylindrical yoke having substantially radial slots uniformly spaced about the circumference in which permanent magnets are mounted, said permanent magnets being magnetized in a circumferential direction with directions of magnetisation which change from magnet to magnet, wherein the cylindrical yoke comprises an isotropic permanent-magnet material which in yoke portions between the permanent magnets is predominantly radially magnetized with such apolarity that the polarity of the resulting magnetic field in the air gap corresponds to the polarity of the magnetic field produced by the permanent magnets, and wherein the permanent magnets in the slots comprise an anisotropic permanent-magnet material.

2. An electric motor as claimed in claim 1, wherein the slots are non-radial and have an inclination between −30° and +30° relative to the radial direction but other than 0°.

3. An electric motor as claimed in claim 1, wherein the coil configuration comprises curved foil windings.

4. An electric motor as claimed in claim 1, wherein the coil configuration comprises curved preformed wound coils.

5. An electric motor as claimed in claim 3, further comprising a cylindrical yoke of a soft-magnetic material disposed at a side of the air gap which faces the permanent magnet, and behind the coil configuration, wherein said yoke is fixedly connected to the coil configuration.

6. An electric motor as claimed in claim 3, further comprising a cylindrical yoke of a soft-magnetic material disposed at a side of the air gap which faces the permanent magnet, and behind the coil configuration is fixedly connected to the permanent magnet.

7. An electric motor as claimed in claim 1, further comprising a cylindrical yoke of a soft-magnetic material disposed at a side of the air gap which faces the permanent magnet, and behind the coil configuration, wherein said yoke is fixedly connected to the coil configuration.

8. An electric motor as claimed in claim 1, further comprising a cylindrical yoke of a soft-magnetic material disposed at a side of the air gap which faces the permanent magnet, and behind the coil configuration, wherein said yoke is fixedly connected to the permanent magnet.

9. The electric motor as claimed in claim 1 wherein said yoke portions are radially magnetized with adjacent yoke portions magnetized in 180° opposite directions.

10. The electric motor as claimed in claim 9 wherein said radial slots are rectangular in shape and support rectangular shaped permanent magnets in which adjacent magnets are oppositely magnetized in the circumferential direction.

11. The electric motor as claimed in claim 1 wherein said radial slots are rectangular in shape and support rectangular shaped permanent magnets in which adjacent magnets are oppositely magnetized in the circumferential direction.

12. The electric motor as claimed in claim 1 wherein said one motor part comprises a rotatable rotor of the motor and which includes the permanent-magnetically excited motor part, and said other motor part comprises the stator of the motor.

13. The electric motor as claimed in claim 12 wherein said slots are non-radial and form an angle between −30° and +30° relative to the radial direction, but excluding an angle of 0°.

14. The electric motor as claimed in claim 1 wherein said permanent magnets generate a magnetic field at the outer circumference of the one motor part which is perpendicular to an axis of rotation of the electric motor.

15. The electric motor as claimed in claim 3 wherein said other motor part comprises a slotless cylindrical stator shell.

16. The electric motor as claimed in claim 1 wherein said coil configuration is free of soft magnetic material.

* * * * *